(12) United States Patent
Gawlik

(10) Patent No.: US 6,349,958 B1
(45) Date of Patent: Feb. 26, 2002

(54) BICYCLING TRAINING DEVICE

(76) Inventor: Christopher Gawlik, 2168 Santa Ana Ct., Portales, NM (US) 88130

( * ) Notice: Subject to any disclaimer, the term of this patent is extended or adjusted under 35 U.S.C. 154(b) by 0 days.

(21) Appl. No.: 09/704,922

(22) Filed: Nov. 2, 2000

Related U.S. Application Data

(60) Provisional application No. 60/163,209, filed on Nov. 2, 1999.

(51) Int. Cl.[7] .................................................. B62H 15/00
(52) U.S. Cl. .................. 280/293; 280/288.4; 16/110.1; 16/426; 16/427
(58) Field of Search .............................. 280/204, 288.4, 280/293, 298, 301, 47.315, 292; 16/110.1, 426, 427

(56) References Cited

U.S. PATENT DOCUMENTS

| | | | | |
|---|---|---|---|---|
| 1,827,401 A | * | 10/1931 | Rader | 280/204 |
| 1,885,627 A | * | 11/1932 | Rader | 280/204 |
| 5,259,638 A | * | 11/1993 | Krauss et al. | 280/293 |
| 5,303,944 A | * | 4/1994 | Kalmus | 280/288.4 |
| 5,577,750 A | * | 11/1996 | Sklar | 280/288.4 |
| 5,683,093 A | * | 11/1997 | Hayes | 280/293 |
| 5,716,065 A | * | 2/1998 | Liu | 280/204 |
| 6,135,479 A | * | 10/2000 | Tibay et al. | 280/288.4 |
| 6,244,612 B1 | * | 6/2001 | Henderson | 280/301 |

FOREIGN PATENT DOCUMENTS

FR 2668744 * 5/1992 ............... 280/288.4

* cited by examiner

*Primary Examiner*—Daniel G. DePumpo
(74) *Attorney, Agent, or Firm*—Jackson Walker L.L.P.

(57) ABSTRACT

A bicycle training device mountable to a conventional bicycle seat neck and operable by a non-rider to guide and control the actions of the bicycle. A mounting bar is attached to the seat neck and a clamping member is releasably attachable to the mounting bar in a first attached position. The non-rider may guide the bicycle and maintain the rider's balance. Once the rider has control of the bicycle, the clamping member is released from the mounting bar by the non-rider by moving the clamper member to a second release position.

4 Claims, 4 Drawing Sheets

BICYCLING TRAINING DEVICE

This application claims priority to provisional patent application Ser. No. 60/163,209 filed Nov. 2, 1999.

BACKGROUND OF THE INVENTION

The present invention relates to a device for training novice bicyclists on how to maintain balance on the bicycle. The present invention provides a safe and easy transition from training wheels to unaided mastery of bicycling skills.

Numerous bicycle training devices are taught in the prior art. These include U.S. Pat. Nos. 5,791,675; 5,338,204; 4,917,398; 4,903,975; 5,028,066; 5,395,130; 5,407,222; 5,176,395; 5,344,171; 5,303,944; 5,217,240, and others. The present invention offers a stable learning platform giving direct feedback to the parent/trainer on the readiness of the child/operator to ride unassisted. The parent/trainer has complete control over the bicycle and can run at speeds necessary to get passed the instability of slow speed. An additional design benefit of the present invention is that the child is unable to see the parent/trainer and actually has no idea if he/she is riding solo. This builds confidence quickly, thinking that he/she is riding all by him/herself expediting the learning curve. The most important benefit is no more painful crashes and happy kids.

SUMMARY OF THE INVENTION

The present invention provides a bicycle training device mountable to a conventional bicycle seat neck and operable by a non-rider (parent/trainer) to guide and control the actions of the bicycle. A T-shaped mounting bar is affixed to the seat neck. The leg of the T-shaped mount extends rearwardly behind the bicycle seat above the rear wheel. The two horizontal arms of the T-shaped mount extend outwardly to the left and right sides of the seat. A clamping member is releasably attached at a first end by a clasp member to the two outwardly extending arms. A release lever is attached to a second end of the clamping member at some distance behind the bicycle. Operation of the release lever causes the clasp member to engage or disengage from the arms, thereby releasing the non-riders control over the bicycle.

DETAILED DESCRIPTION OF THE PREFERRED EMBODIMENT

Figure 1:
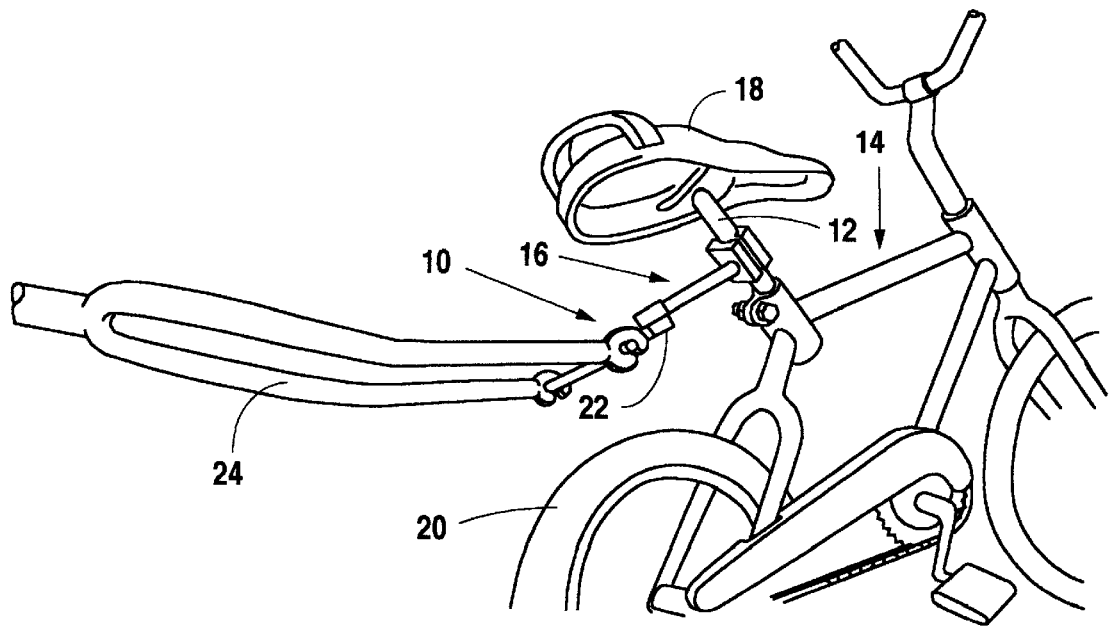
FIG. 1 shows a perspective view of the present invention attached to a conventional bicycle seat neck.

FIG. 1 shows a perspective view of the training device 10 attached to a conventional seat neck bar 12 of a bicycle 14. The device 10 has a T-shaped mounting bar 16 attached generally perpendicularly to the neck bar 12 and extending rearwardly beneath the seat 18 and above the rear wheel 20.

The mounting bar 16 has a pivot joint 22 which allows for rotation in the horizontal plane (±40°). Attached to the mounting bar is the clamping member 24. In the position shown in FIG. 1, a rider could be controlled and balanced by a non-rider guiding the bicycle 14 through the training device 10.

Figure 2:
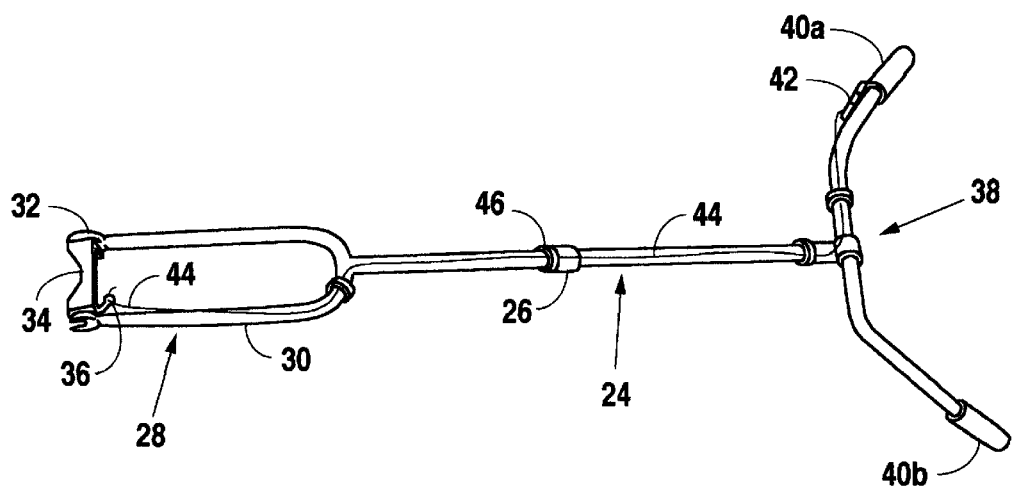
FIG. 2 illustrates a top plan view of the clamping member of the present invention.

As shown in FIG. 2, clamping member 24 has a generally cylindrical main shaft portion 26. At a first end 28, the clamping member has a forked section 30. The forks are two, spaced-apart, generally parallel, tubes which provide stability to the device. One end of the fork has the junction of the two tubes and is attached to the main shaft 26. The other end of the fork has opposed, spaced-apart, C-shaped yokes 32 which fit around the arms of the mounting bar 16 as will be described below. Also, at the second end 28 is a clasp member 34 which engages around the mounting bar arms upon operation of a spring-loaded release clamp 36.

At a second end of the main shaft 26 is a handle bar 38 with spaced-apart grip portions 40a and 40b. A grip closure lever 42 similar to the well-known bicycle hand brake is attached to the handle bar 38 at one of the grips. The lever 42 controls the opening and closing of the clasp member 34 via a cable 44 extending from the lever 42 to the spring-loaded release clamp 36.

The main shaft 26 may be extended or shortened through a well-known telescoping action controlled by tightening collars 46. Thus, the non-rider may control the distance the handle bar 38 is away from the clasping member and the distance from the rider.

Figure 3:
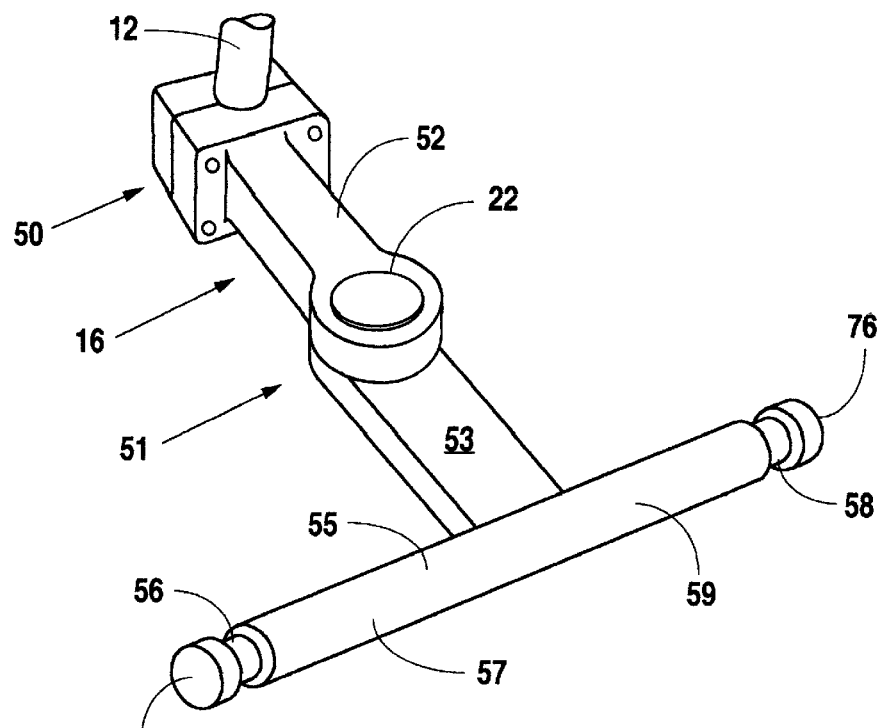
FIG. 3 is a rear view of the mounting bar showing the recessed notches in the arms.
Figure 4:
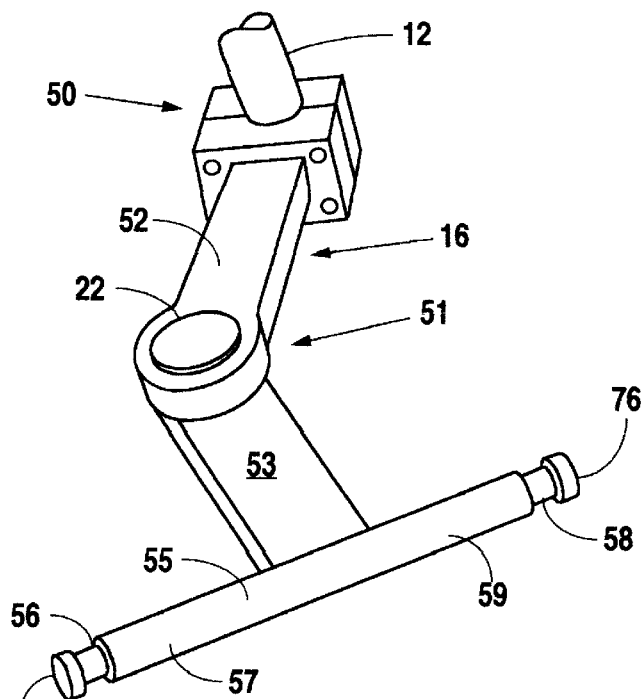
FIG. 4 illustrates the rotation of the pivot joint in the mounting bar of the present invention.

The T-shaped mounting bar 16 is shown in FIG. 3. An attachment collar 50 may be tightened around the seat neck bar 12. The main leg portion 51 is divided by pivot joint 22 into front leg section 52 and rear leg section 53. The pivot joint allows for rotation of the rear leg section from ±40° in a horizontal plane (see FIG. 4). At the end of the rear leg section 53, opposite the collar 50, is the horizontal arm 55 which has a left and right arm section (57 and 59, respectively).

Each arm 57 and 59 has a recessed clasp notch 56 and 58, respectively, along a length of each arm section. These notches receive, engage, and center C-shaped yokes 32 on the clamping member 24.

Figure 5:
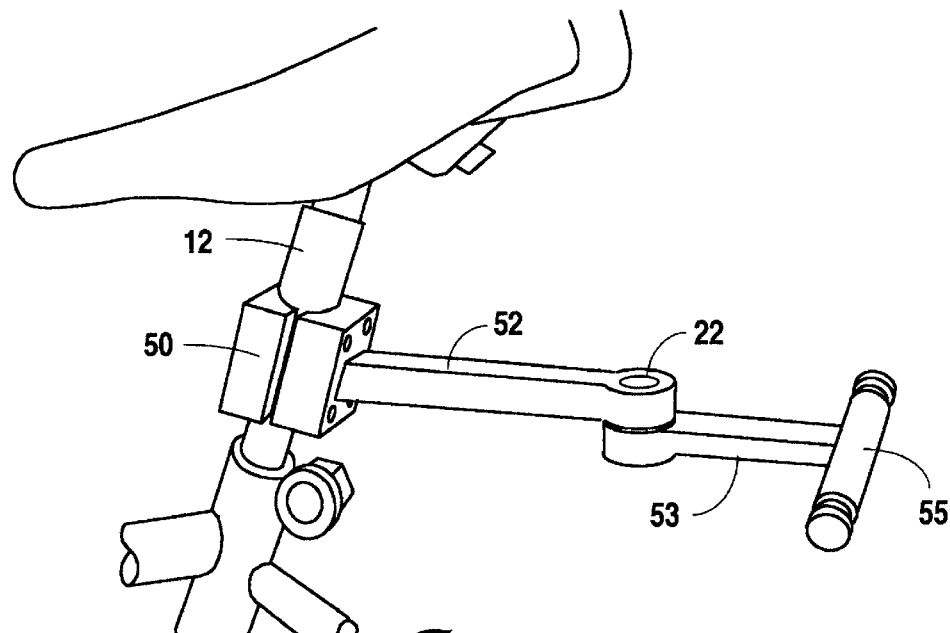
FIG. 5 shows a side elevation view of the T-shaped mounting bar attached to a conventional bicycle seat neck.

FIG. 5 illustrates a side elevation view of the T-shaped mounting bar 16. Pivot or swivel joint 22 is clearly shown. The leg is divided into a front leg section 52 and a rear leg section 53. The horizontal arm portion 55 extends left and right of the seat.

Figure 6:
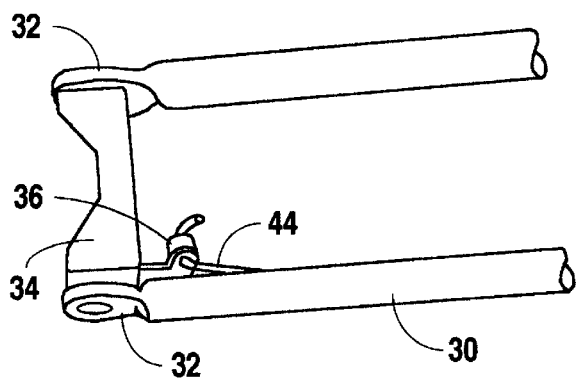
FIG. 6 shows a top plan view of the clasp and release mechanism of the present invention.

A detailed top plan view of the second end 28 of the clamping member 24 is shown in FIG. 6. At the end of the fork section 30 are the opposed and spaced-apart C-shaped yokes 32. The clasp 34 is shown with spring-loaded release clamp 36 and activation cable 44.

Figure 7:
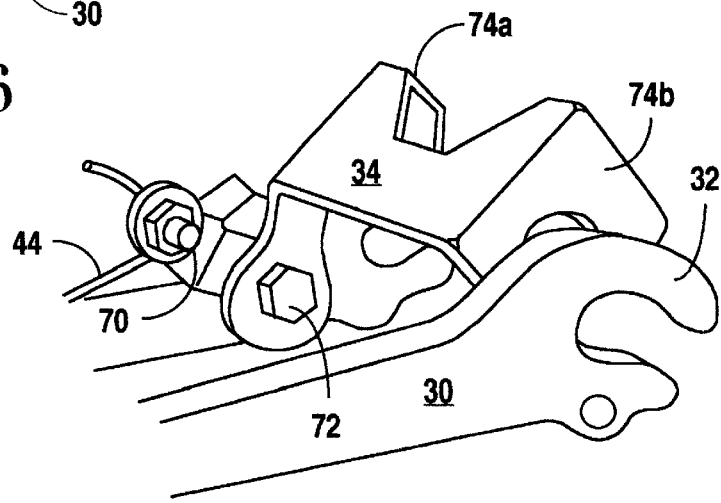
FIG. 7 illustrates a detailed perspective view of the clasp in an open (released) position.

FIG. 7 shows the clasp 34 in the open position as pulled open by cable 44. An adjustment screw system 70 and pivot 72, well-known in the bicycle hand brake art, allows for closure adjustments to the clasp 34. C-shaped yokes 32 shown in FIG. 7 engage around the recessed notches 56 and 58 in the arms 57 and 59. Downwardly depending hooks 74a and 74b on clasp 34 wrap around the arms 57 and 59, respectively, when engaged by the release mechanism at the handle bars on the opposite end of the clamping member.

Figure 8:
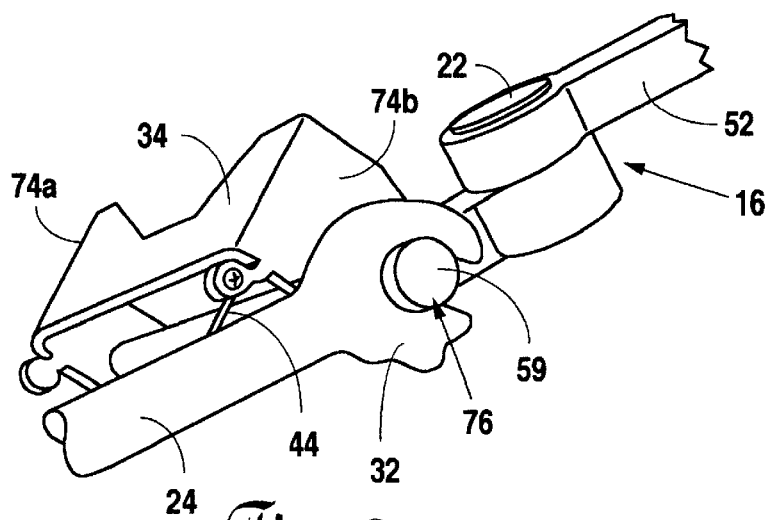
FIG. 8 is a detailed view of the clamping member in the open position attached to the T-shaped mounting bar.

FIG. 8 illustrates the clamping member 24 attached to the mounting bar 16, but the clasp 34 is in the open or release position. In this position the bicycle could be released by the nonrider by allowing the bicycle to slide out of the yokes 32.

Figure 9:
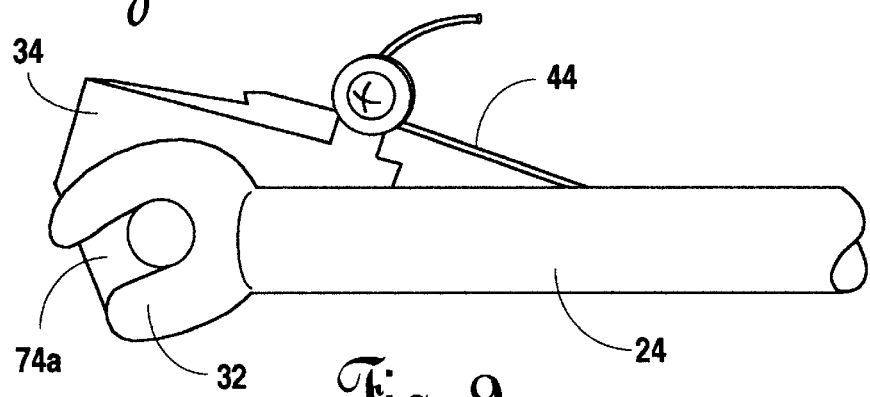
FIG. 9 illustrates a detailed side view of the clasp in a closed position.

FIG. 9 shows the clasp 34 closed, but not engaged with the mounting bar 16. This figure simply illustrates how the hooks 74a and 74b may wrap around and form a closure about the arms.

Figure 10:
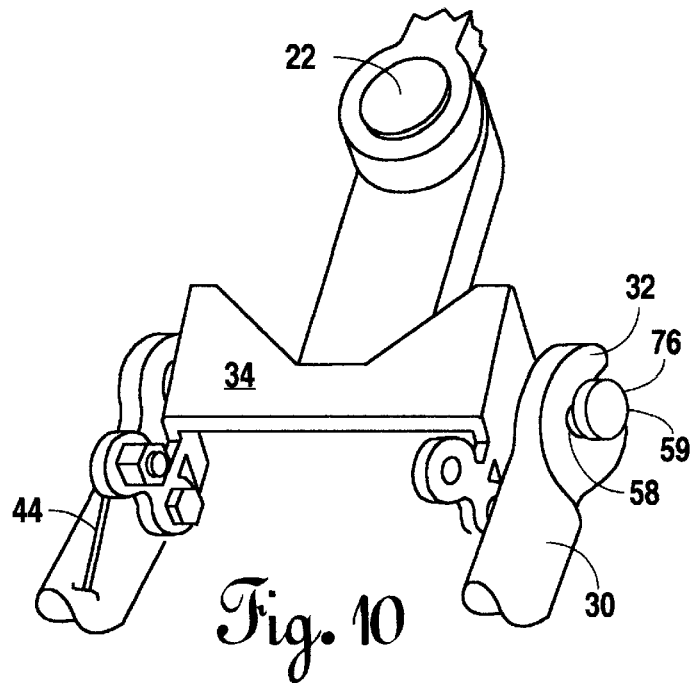
FIG. 10 shows a detailed perspective view of the clasp in a closed position attached to the mounting bar.

In FIG. 10, it may be seen how the closed clasp 34 holds the clamping member 24 to the mounting bar 16 so that the non-rider has control of the bicycle. The yokes 32 are retained in the notches 56 and 58 and centered on the horizontal arm 55 by the shoulders 76 on arms 57 and 59.

In operation the mounting bar or T-bar 16, attaches to the seat neck 12. The T-bar 16 becomes the center of gravity once the child sits on the bicycle. The T-bar 16 incorporates a pivot joint 22 that rotates approximately ±40° in the horizontal plane. This feature dampens out the pendulum effect once the device 10 is attached and allows for "true free riding feel" by the rider without being out of control. The ends or shoulders 76 of the T-bar 16 are rounded to provide added safety. On the T-bar horizontal arm 55 indentation guides (or recess notches) 56 and 58 are provided to eliminate side-to-side slippage of the clamping member 24.

An essential feature of the system is the clamping member 24. The design function is a controlling feedback device that secures the parent/trainer (non-rider) to the child (rider) learning to ride the bicycle. The clamping member 24 is approximately 4.5 feet long but may be varied by a telescoping action previously discussed. The clamping member 24 breaks down in two pieces for easy storage. This variable length ensures that the clamping member 24 safely clears the rear wheel 20 of the bicycle. With this clearance the parent/trainer can run behind the bicycle at full stride as necessary, thereby avoiding the unstable slow speed which results in crashes.

Another important feature of the clamping member 24 is the bicycle style fork section 30. The fork section 30 attaches to the T-bar 16 at the C-shaped yokes 32 giving the parent/trainer the ability to prevent the child from falling sideways. The fork 30 also provides the strength to initially propel the rider to speeds that are comfortable. The fork 30 attaches to the T-bar 16 in the indentation portion (or recessed notches) 56 and 58 of the bar. The connection of the T-bar 16 and the clamping member 24 gives full rotation in the vertical making it comfortable to use for a short or tall person.

Another unique feature that makes the present invention 10 successful is the release mechanism 34. This mechanism gives the invention a quick connect and disconnect capability.

The release mechanism is spring-loaded closed or opened with the conventional arrangement of a traditional brake handle 42. Another important grappling feature is the full stopping control of the bicycle when attached in the closed position. This is the result of the hooks 74a and 74b in the release mechanism firmly securing over the horizontal arm 55 of the T-bar 16.

The handle bar style clamping member 24 with fork 30 design gives the parent/trainer the fulcrum capability to overcome the momentum of falling sideways. This ability along with the stopping capability due to the release mechanism are significant reasons for the present invention being a complete success at teaching kids to transition away from training wheels.

Although the invention has been described with reference to a specific embodiment, this description is not meant to be construed in a limiting sense. On the contrary, various modifications of the disclosed embodiments will become apparent to those skilled in the art upon reference to the description of the invention. It is therefore contemplated that the appended claims will cover such modifications, alternatives, and equivalents that fall within the true spirit and scope of the invention.

What is claims is:

1. A bicycle training device mountable to a conventional bicycle seat neck and operable by a non-rider to guide and control the actions of said bicycle, said device comprising:

a T-shaped mounting bar adapted to be affixed generally perpendicularly to and extending rearwardly from said seat neck by a leg portion with two arms of said T-shaped bar extending generally perpendicularly and sidewardly from said leg portion, each of said arms having a recess clasp-receiving notch along a length of each of said arms;

a clamping member releasably attachable at a first end to said mounting bar, said clamping member having a release mechanism attached to a second end of said clamping member for moving a clasp member at said first end from a first attached position to a second unattached position, said clasp member thereby being releasably engageable from said recessed clasp notches in said arms.

2. The device of claim 1 wherein said mounting bar further comprises a pivot joint attached along the length of said leg portion, said pivot joint enabling said clamping member to rotate approximately ±40° in a horizontal plane.

3. The device of claim 1 wherein said clamping member further comprises a forked section having a plurality of rearwardly extending spaced-apart posts.

4. The device of claim 1 wherein said release mechanism further comprises:

a grip closure lever attached to a first end of a cable and to said second end of said clamping member;

a spring-loaded clamp attached to a second end of said cable and to said clasp member, whereby closure of said lever pulls said cable to release said clasp member from said arms.

* * * * *